US010785463B2

(12) United States Patent
Appia et al.

(10) Patent No.: US 10,785,463 B2
(45) Date of Patent: Sep. 22, 2020

(54) SUPER-RESOLUTION IN STRUCTURED LIGHT IMAGING

(71) Applicant: Texas Instruments Incorporated, Dallas, TX (US)

(72) Inventors: Vikram VijayanBabu Appia, Dallas, TX (US); Ibrahim Ethem Pekkucuksen, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 942 days.

(21) Appl. No.: 14/322,887

(22) Filed: Jul. 2, 2014

(65) Prior Publication Data

US 2015/0022642 A1      Jan. 22, 2015

Related U.S. Application Data

(60) Provisional application No. 61/846,746, filed on Jul. 16, 2013.

(51) Int. Cl.
| | |
|---|---|
| *H04N 13/106* | (2018.01) |
| *G06T 3/40* | (2006.01) |
| *H04N 13/243* | (2018.01) |
| *H04N 13/282* | (2018.01) |
| *H04N 13/25* | (2018.01) |
| *H04N 13/00* | (2018.01) |

(52) U.S. Cl.
CPC ......... *H04N 13/106* (2018.05); *G06T 3/4053* (2013.01); *H04N 13/243* (2018.05); *H04N 13/25* (2018.05); *H04N 13/282* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 2002/0061131 A1* | 5/2002 | Sawhney | G06T 15/205 |
| | | | 382/154 |
| 2008/0118143 A1* | 5/2008 | Gordon | G01B 11/2513 |
| | | | 382/154 |
| 2009/0015791 A1* | 1/2009 | Chang | G03B 21/00 |
| | | | 353/6 |

OTHER PUBLICATIONS

Gribbon et al., "A Novel Approach to Real-time Bilinear Interpolation," Proceedings of the Second IEEE International Workshop on Electronic Design, Test and Applications, 2004.*

(Continued)

*Primary Examiner* — Christopher Braniff
(74) *Attorney, Agent, or Firm* — Ebby Abraham; Charles A. Brill; Frank D. Cimino

(57) ABSTRACT

A method of image processing in a structured light imaging device is provided that includes capturing a plurality of images of a scene into which a structured light pattern is projected by a projector in the structured light imaging device, extracting features in each of the captured images, finding feature matches between a reference image of the plurality of captured images and each of the other images in the plurality of captured images, rectifying each of the other images to align with the reference image, wherein each image of the other images is rectified based on feature matches between the image and the reference image, combining the rectified other images and the reference image using interpolation to generate a high resolution image, and generating a depth image using the high resolution image.

20 Claims, 2 Drawing Sheets

(56) References Cited

OTHER PUBLICATIONS

Gribbon et al., "A NOvel Approach to Real-time Bilinear Interpolation," Proceedings of the Second IEEE International Workshop on Electric Design, Test and Applications, 2004.*
David G. Lowe, "Distinctive Image Features from Scale-Invariant Keypoints", International Journal of Computer Vision, Jan. 5, 2004, pp. 1-28.
Sebastian Schuon et al, "LidarBoost: Depth Superresolution for ToF 3D Shape Scanning", IEEE Conference on Computer Vision and Pattern Recognition, Jun. 20-25, 2009, pp. 343-350, Miami, FL.
Chris Harris and Mike Stephens, "A Combined Corner and Edge Detector", Proceedings of Fourth Alvey Vision Conference, 1988, pp. 147-151.
Michael Calonder et al, "BRIEF: Binary Robust Independent Elementary Features", Proceedings of the 11th European Conference on Computer Vision: Part IV, Sep. 5-11, 2010, pp. 778-792, Herakion, Crete, Greece.
Michael E. Tipping and Christopher M. Bishop, "Bayesian Image Super-Resolution," Proceedings of the 15th International Conference on Neural Information Processing Systems, Jan. 2002, pp. 1303-1310.
Lyndsey C. Pickup, et al., "Bayesian Image Super-Resolution, Continued," Proceedings of the 19th International Conference on Advanced Neural Information Processing Systems, Dec. 2006, pp. 1089-1096.
Yu-Wang Tai, et al., "Super Resolution Using Edge Prior and Single Image Detail Synthesis," 2010 IEEE Computer Society Conference on Computer Vision and Pattern Recognition, Jun. 13-18, 2010, San Francisco, California, pp. 1-8.

* cited by examiner

SUPER-RESOLUTION IN STRUCTURED LIGHT IMAGING

CROSS-REFERENCE TO RELATED APPLICATIONS

This application claims benefit of U.S. Provisional Patent Application Ser. No. 61/846,746, filed Jul. 16, 2013, which is incorporated by reference herein in its entirety.

BACKGROUND OF THE INVENTION

Field of the Invention

Embodiments of the present invention generally relate to using multiple-frame super-resolution to generate a high resolution depth image in a structured light imaging device.

Description of the Related Art

In structured light imaging devices, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the pattern in the captured image in comparison to the projected pattern.

In a typical structured light imaging device, the camera has higher resolution and lower frame rates than the projector. A camera typically has higher resolution to provide precision in the detection of the projected pattern. However, high resolution cameras tend to have lower frame rates, e.g., 30 frames per second, thus making such cameras bottlenecks in increasing the frame rates of a structured light imaging device.

SUMMARY

Embodiments of the present invention relate to methods and apparatus for using multiple-frame super-resolution to generate a high resolution depth image. In one aspect, a method of image processing in a structured light imaging device is provided that includes capturing a plurality of images of a scene into which a structured light pattern is projected by a projector in the structured light imaging device, extracting features in each of the captured images, finding feature matches between a reference image of the plurality of captured images and each of the other images in the plurality of captured images, rectifying each of the other images to align with the reference image, wherein each image of the other images is rectified based on feature matches between the image and the reference image, combining the rectified other images and the reference image using interpolation to generate a high resolution image, and generating a depth image using the high resolution image.

In one aspect, a structured light imaging device is provided that includes a projector configured to project a structured light pattern into a scene, and a memory configured to store software instructions that, when executed by at least one processor in the structured light imaging device, cause a method of image processing to be performed. The method includes capturing a plurality of images of a scene into which a structured light pattern is projected by the projector, extracting features in each of the captured images, finding feature matches between a reference image of the plurality of captured images and each of the other images in the plurality of captured images, rectifying each of the other images to align with the reference image, wherein each image of the other images is rectified based on feature matches between the image and the reference image, combining the rectified other images and the reference image using interpolation to generate a high resolution image, and generating a depth image using the high resolution image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
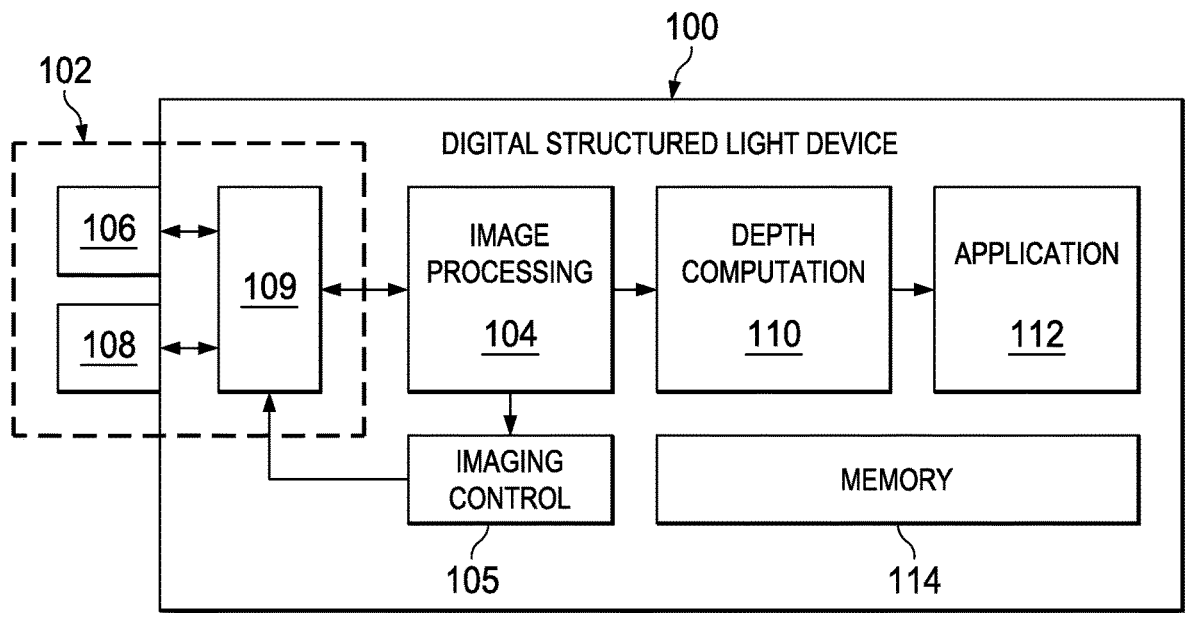
FIG. 1 is a block diagram of an example digital structured light device.

Specific embodiments of the invention will now be described in detail with reference to the accompanying figures. Like elements in the various figures are denoted by like reference numerals for consistency.

As previously mentioned, high resolution, e.g., 1280× 720, cameras typically used in structured light imaging devices have low frame rates, e.g., 30 frames per second (fps), as compared to projectors used in such devices, and thus the overall frame rate of such devices is limited by the frame rates of the cameras. Embodiments of the invention provide for using low resolution, e.g., 240×320, cameras with a high frame rate, e.g., 180 fps, in a structured light imaging device. In such devices, a high resolution image of the scene is generated by combining multiple lower resolution images using a multiple-frame super-resolution algorithm. The high resolution image is then used to generate a depth map.

Multiple-frame super-resolution uses the sub-pixel shifts between multiple low resolution images of the same scene to create a single higher resolution image fusing information from the low resolution images. The resulting higher resolution image provides a better description of the scene. In some embodiments, the needed sub-pixel level variation in the captured images is obtained by using an array of cameras capturing images of a scene concurrently with projection of a structured light pattern. In other embodiments, the sub-pixel level variation in the captured images is obtained by using a single camera to captured images of a projected structured light pattern and corresponding shifted patterns. In such embodiments, the camera and projector parameters, e.g., field of view, resolution, and orientation, are different and the shifted patterns will have a sub-pixel shift in each of the captured images with respect to the original captured pattern without the shift.

FIG. 1 is a block diagram of an example digital structured light device 100 configured to use super-resolution in the generation of depth images. More specifically, the digital structured light device 100 is configured to perform an embodiment of the method of FIG. 3 to generate a depth image from a high resolution image generated by applying a multiple-frame super-resolution algorithm to multiple low-resolution images of scene with a projected structured light pattern.

The digital structured light device 100 includes a structured light imaging sub-system 102, an image processing component 104, an imaging control component 105, a memory component 114, a depth computation component 110, and an application component 112. The components of the digital structured light device 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 114 and executed by one or more processors (not specifically shown).

The structured light imaging sub-system 102 includes an imaging sensor component 106, a projector component 108, and a controller component 109. The imaging sensor component 106 is an imaging sensor system arranged to capture image signals of a scene and the projector component 108 is a projection system arranged to project one or more structured light patterns into the scene. In some embodiments, the imaging sensor component 106 includes a lens assembly, a lens actuator, an aperture, and an imaging sensor. In some embodiments, the imaging sensor component 106 is an array of imaging sensors, each having a lens assembly, a lens actuator, and an aperture. The projector component 108 includes a projection lens assembly, a lens actuator, an aperture, a light source, and projection circuitry.

The structured light imaging sub-system 102 also includes circuitry for controlling various aspects of the operation of the sub-system, such as, for example, aperture opening amount, exposure time, synchronization of the imaging sensor component 106 and the projector component 108, etc. The controller component 109 includes functionality to convey control information from the imaging control component 105 to the imaging sensor component 106 and the projector component 108, to convert analog image signals from the imaging sensor component 106 to digital image signals, and to provide the digital image signals to the image component 104.

In some embodiments in which the imaging sensor component 106 includes a single imaging sensor, the imaging sensor component 106 and the projector component 108 may be arranged vertically such that one component is on top of the other, i.e., the two components have a vertical separation baseline. In some embodiments in which the imaging sensor component 106 includes a single imaging sensor, the imaging sensor component 106 and the projector component 108 may be arranged horizontally such that one component is next to the other, i.e., the two components have a horizontal separation baseline. In some embodiments in which the imaging sensor component 106 includes an imaging sensor array, the imaging sensor used to capture the reference image and the projector component 108 may be arranged vertically such that the projector component 108 and the imaging sensor have a vertical separation baseline. In some embodiments in which the imaging sensor component 106 includes an imaging sensor array, the imaging sensor used to capture the reference image and the projector component 108 may be arranged horizontally such that the projector component 108 and the imaging sensor have a horizontal separation baseline.

The image processing component 104 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment. Note that in embodiments in which the imaging sensor component 106 is an array of imaging sensors, the image processing component 104 performs the above processing for incoming digital signals from each of the imaging sensors.

Figure 3:
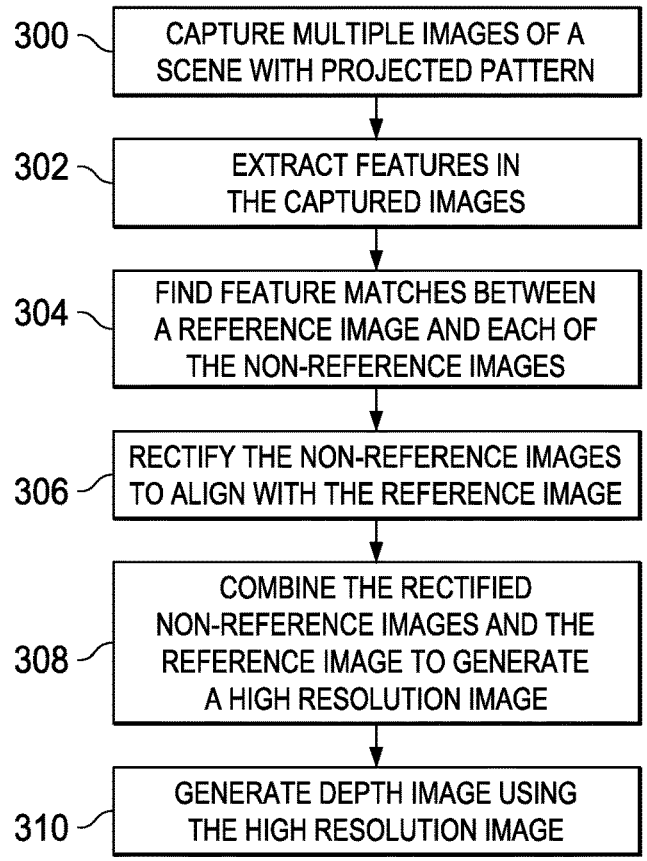
FIG. 3 is a flow diagram of a method.

The depth computation component 110 then uses the enhanced image data to perform the processing steps of an embodiment of the method of FIG. 3 to generate high resolution depth images from multiple low resolution images captured by the imaging sensor component 106. The high resolution depth images are provided to the application component 112 for further application specific processing.

The memory component 114 may be on-chip memory, external memory, or a combination thereof. Any suitable memory design may be used. For example, the memory component 110 may include static random access memory (SRAM), dynamic random access memory (DRAM), synchronous DRAM (SDRAM), read-only memory (ROM), flash memory, a combination thereof, or the like. Various components in the digital structured light device 100 may store information in memory in the memory component 114 as images are processed.

Further, the memory component 114 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 100. In some cases, the software instructions may also be sold in a computer program product, which includes the computer-readable medium and packaging materials for the computer-readable medium. In some cases, the software instructions may be distributed to the digital structured light device 100 via removable computer readable media (e.g., floppy disk, optical disk, flash memory, USB key), via a transmission path from computer readable media on another computer system (e.g., a server), etc.

The imaging control component 105 controls the overall functioning of the structured light imaging sub-system 102. For example, the imaging control component 105 may adjust the focus of the imaging sensor component 106 and/or the projector component 108 based on the focus quality and scene brightness, respectively, determined by the image processing component 104. The imaging control component 105 may also control the synchronization of the imaging sensor component 106 with the projector component 108 to capture images of the scene with the projected pattern. In embodiments in which the imaging sensor component 106 is an array of imaging sensors, the imaging control component 105 causes each of the imaging sensors to capture an image concurrent with the projection of a pattern by the projector component 108 to generate the multiple images needed to generate the depth image as per the method of FIG. 3.

In embodiments in which the imaging sensor component 106 has a single imaging sensor, the imaging control component 105 controls the projector component 108 and the imaging sensor component 106 to generate the multiple images needed to generate the depth image as per the method of FIG. 3. More specifically, the imaging control component 105 causes the projector component 108 to project the pattern and one or more shifted versions of the pattern into the scene and causes the imaging sensor component 106 to capture an image of the scene with the original projected pattern and images of the projection of each of the shifted versions. As is discussed in more detail in reference to FIG. 3, the number of shifted versions of the pattern used may be application dependent and/or may depend on the image processing throughput of the device 100.

The application component 112 receives the high resolution depth images and performs any additional processing needed for the particular application of the digital structured light device 100. The application component 112 may implement an application or applications that rely on a three-dimensional (3D) representation of a scene. For example, the application component 112 may be a 3D reconstruction application that generates a point clouds (a collection of x, y, and z coordinates representing the locations of objects in 3D space) from depth maps. In another example, the application component 112 can be use the high resolution depth images for rendering in computer graphics or for printing 3D models of the scene. In another example, the application component 112 may be an industrial fault detection application in which 3D models are used to detect faults.

Figure 2:
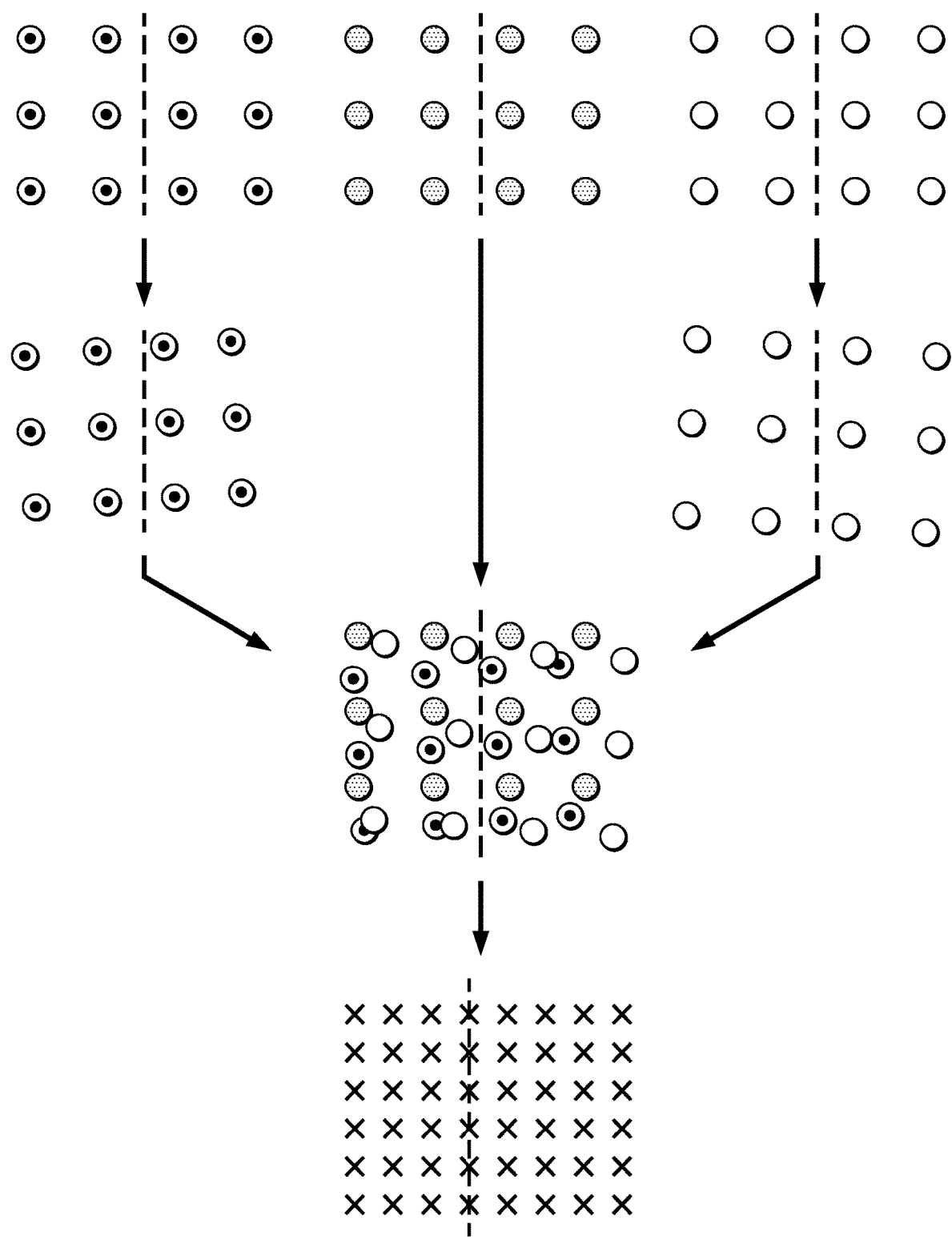
FIG. 2 is an example.

FIG. 2 is a simple example illustrating the use of multiple-frame super-resolution to generate a high resolution image of a scene. In this example, the projection of a single line into the scene is assumed and the top row of pixel arrays are simple illustrations of subsets of captured images of the scene with the projected line from three different cameras at slightly differing perspectives. The dotted vertical lines represent the location of the line in the particular image pixel subset. As can be seen from the top row, the projected line is at a slightly different location in each image and is between pixels, i.e., is at sub-pixel locations.

The middle image pixel subset of the top row is assumed to be the reference image. The other two images are aligned with the reference image based on feature matching, and then the pixel values of the three aligned images are interpolated to generate the higher resolution image with exact pixel locations of the projected line.

FIG. 3 is a flow diagram of a method for computing a depth image using multiple-frame super-resolution in a structured light imaging device, e.g., the digital structured light device 100 of FIG. 1. For simplicity of explanation, the method is explained assuming that a single fixed structured light pattern is used. One of ordinary skill in the art will understand embodiments in which other types of structured light patterns are used, e.g., a time-multiplexed pattern.

As shown in FIG. 3, initially, multiple images of a scene with a projected structured light pattern are captured 300. In some embodiments, the multiple images are captured by a camera array in the structured light imaging device concurrently with the projection of the structured light pattern into the scene. The number of images captured depends on the number of cameras in the camera array. The particular number of cameras included in a camera array may be application dependent. Typical camera arrays are 2×2, 3×3, or 4×4 but larger camera arrays may also be used. In some embodiments, the multiple images are captured by a single camera. In such embodiments, images are captured of the original pattern and of one or more shifted versions of the pattern. More specifically, an image is captured with the original structured light pattern projected in to the scene. The pattern is then shifted, e.g., by one pixel, and an image is captured with the shifted pattern projected into the scene. The shifting and capturing is repeated until the desired number of images is captured. The number of images to be captured and the amount the pattern is shifted for each image may be application dependent.

Features are then extracted 302 from each of the captured images. Any suitable feature detection algorithm may be used. Examples of suitable algorithms include SIFT (Scale Invariant Feature Transform) and Harris corner detection. The SIFT algorithm is described in D. G. Lowe, "Distinctive Image Features from Scale-Invariant Keypoints," International Journal of Computer Vision, Vol. 60, No. 2, pp. 91-110, November 2004 ("Lowe" herein). Harris corner detection is described in C. Harris and M. Stephens, "A Combined Corner and Edge Detector," Proceedings of Fourth Alvey Vision Conference, pp. 147-151, 1988. In another example, if the projected pattern is a simple stripe pattern as is the case with some time-multiplexed patterns, a search based algorithm can be used to detect the corners of these stripes to extract the features.

Next, matches between the extracted features of a reference image and extracted features of the other non-reference images are found 304. The designation of which of the images is to be the reference image may be application dependent. In embodiments in which the images are captured by a camera array, the reference image may be, for example, from one of the more central cameras in the camera array. In embodiments in which a single camera is used to capture the multiple images, the reference image may be the image with the original, non-shifted pattern. In some embodiments, the reference image is from a camera that is located in either a horizontal or a vertical baseline with the projector.

Any suitable algorithm may be used to find matches between the features of the reference image and the features of each of the non-reference images. Examples of suitable matching algorithms include the matching algorithm described in Lowe and the BRIEF (Binary Robust Independent Elementary Features) algorithm described in M. Calonder et al., "BRIEF: Binary Robust Independent Elementary Features," Proceedings of the $11^{th}$ European Conference on Computer Vision: Part IV, pp. 778-792, September 2010.

Each of the non-reference images is then rectified 306 based on the feature matches between the image and the reference image to align the image with the reference image. For each non-reference image, the matched features with the reference image are used to determine alignment correction parameters of a 2D image alignment transformation model such as an affine transformation model or a perspective transformation model. The parameters of the transformation model may be estimated using an iterative process as follows. Least squares estimates of the parameters values are computed using the data set of matched features. The transformation model with the estimated parameter values is then applied to the features of the non-reference image and the errors between the locations of the transformed features of the non-reference image and the locations of the matching features of the reference image are evaluated. If all the errors are below an error threshold, the estimated parameters values are accepted as the final parameter values. If there are any errors above the threshold, matched features with high error are removed from the data set and the parameters are estimated again with the reduced set of features. The process is repeated until a set of parameter values is estimated in which the errors are below the error threshold. Once the parameter values are estimated, the transformation model is applied to the non-reference image using the determined parameter values to rectify the non-reference image, i.e., to better align the non-reference image with the reference image.

The reference image and the rectified non-reference images are then combined using interpolation 308 to generate a high resolution image. More specifically, interpolation is applied to the pixel values to create the high resolution image. In some embodiments, the interpolation used is a linear weighted average of neighboring pixels from all the images (reference and rectified) at a given grid point in the high-resolution image. A prior based on the projected pattern may then be applied to the interpolated pixel values to generate the final high resolution image. Application of the prior will improve the accuracy of the depth image. For example, if the projected pattern is a binary pattern, the prior would be that each pixel value in the high resolution image should have a value of 0 or 1. So, each of the interpolated pixel values is rounded to 0 or 1 to generate the pixel values in the final high resolution image. Other priors that may be used depending on the projected pattern include sinusoidal patterns and a linear grayscale ramp.

A depth image is generated 310 from the high resolution image and output for further application specific processing. Any structured light depth image generation algorithm appropriate for the projected pattern may be used to generate the depth image. For example, if a single fixed pattern is projected, a pattern matching algorithm on the high resolution image and the pattern may be used to generate the depth image. In another example, if time-multiplexed patterns such as gray codes are used, a gray code decoding on the high-resolution image to estimate correspondences may be used to generate the depth image.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which a pattern image is shifted one or more times and images are captured of the projected shifted pattern to capture the images needed for generating the high resolution image. One of ordinary skill in the art will understand embodiments in which, rather than shifting the pattern, the camera is physically moved by small amounts to capture the images needed for generating the high resolution image.

Embodiments of the method described herein may be implemented in any suitable combination of hardware, software, and firmware. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
   projecting, by a projector in a structured light imaging device, a structured light pattern to a scene;
   capturing, by an imaging sensor component in the structured light imaging device, a reference image and a second image of the scene for a depth image of the scene, the reference image and the second image have a lower resolution than a resolution desired for the depth image;
   extracting a first feature in the reference image and a second feature in the second image;
   determining a match between the first feature and the second feature;
   computing least square estimates for alignment correction parameter values of a two-dimension (2D) image alignment transformation model based on the determined match between the first feature and the second feature;
   rectifying the second image to align with the reference image by applying the 2D image alignment transformation model to the second image;
   generating a combined image based in part on combining the rectified second image with the reference image, wherein the combined image has a higher resolution than the reference image and the second image; and
   generating the depth image using the combined image.

2. The method of claim 1, wherein the imaging sensor component comprises an imaging sensor array and the reference image and the second image are captured concurrently.

3. The method of claim 1, wherein the imaging sensor component comprises a single imaging sensor, and wherein the reference image includes the projected structured light pattern at a first position in the scene and is captured at a first time, and the second image includes the projected structured light pattern at a second position in the scene shifted from the first position and is captured at a second time.

4. The method of claim 1, wherein the imaging sensor component comprises a single imaging sensor, and wherein the reference image is captured at a first time with the single imaging sensor at a first position, and the second image is captured at a second time with the single imaging sensor at a second position.

5. The method of claim 1, wherein combining the rectified second image with the reference image uses a linear weighted average of corresponding pixels.

6. The method of claim 1, wherein combining the rectified second images and the reference image further comprises applying a prior based on the structured light pattern to interpolated pixel values to determine final pixel values in the combined image.

7. The method of claim 1, wherein the projected structured light pattern is a stripe pattern and extracting the first feature and second feature is based on detecting a corner of the stripe pattern.

8. A device comprising:
   a projector component configured to project a structured light pattern into a scene;
   an imaging sensor component configured to capture images of the scene including the projected structured light pattern; and
   a memory configured to store software instructions that, when executed by at least one processor in the device, cause the at least one processor to:
   capture, using the imaging sensor component, a reference image and a second image of the scene for depth image of the scene, wherein the scene includes the projected structured light pattern and wherein the reference image and the second image have a lower resolution than a resolution desired for the depth image;
   extract a first feature in the reference image and a second feature in the second image;
   determine a match between the first feature and the second feature;

compute least square estimates for alignment correction parameter values of a two-dimension (2D) image alignment transformation model based on the determined match between the first feature and the second feature;

rectify the second image to align with the reference image by applying the 2D image alignment transformation model to the second image;

generate a combined image based in part on combining the rectified second image with the reference image, wherein the combined image has a higher resolution than the reference image and the second image; and generate the depth image using the combined image.

9. The device of claim 8, wherein the imaging sensor component includes an imaging sensor array and the reference image and the second image are captured concurrently.

10. The device of claim 8, wherein the imaging sensor component includes a single imaging sensor and wherein the instructions that cause the at least one processor to capture, using the imaging sensor component, the reference image and the second image includes instructions that cause the imaging sensor component to use the single imaging sensor to capture the reference image at a first time and the second image at a second time, wherein the scene at the first time includes the structured light pattern at a first position, and the scene at the second time includes the structured light pattern at a second position.

11. The device of claim 8, wherein the imaging sensor component includes a single imaging sensor and wherein the instructions that cause the at least one processor to capture, using the imaging sensor component, the reference image and the second image include instructions that cause the imaging sensor component to use the single imaging sensor at a first position to capture the reference image and to use the single imaging sensor at a second position to capture the second image.

12. The device of claim 8, wherein combining the rectified second image with the reference image uses a linear weighted average of corresponding pixels.

13. The device of claim 8, wherein the instructions that cause the at least one processor to combine the rectified second image with the reference image include instructions that cause the at least one processor to apply a prior based on the structured light pattern to interpolated pixel values to determine final pixel values in the combined image.

14. The device of claim 8, wherein the single projector component and the imaging sensor component have one of a horizontal separation baseline and a vertical separation baseline.

15. A system comprising:

a projector component configured to project a structured light pattern into a scene;

an imaging sensor component configured to capture a reference image and a second image of the scene, wherein the scene includes the projected structured light pattern; and one or more processors configured to generate a depth image of the scene based in part on the reference image and the second image, wherein a resolution of the reference image and the second image is lower than a resolution desired for the depth image, the one or more processors configured to:

extract a first feature in the reference image and a second feature in the second image;

determine a match between the first feature and the second feature;

compute least square estimates of alignment correction parameter values of a two-dimension (2D) image alignment transformation model based on the determined match between the first feature and the second feature;

rectify the second image to align with the reference image by applying the 2D image alignment transformation model to the second image;

generate a combined image based in part on combining the rectified second image with the reference image, wherein the combined image has a higher resolution than the reference image and the second image; and generate a depth image using the combined image.

16. The system of claim 15, wherein the imaging sensor component includes an imaging sensor array and the reference image and the second image are captured concurrently.

17. The system of claim 15, wherein the imaging sensor component comprises a single imaging sensor, wherein the reference image is captured at a first time and the second image is captured at a second time, wherein the scene at the first time includes the structured light pattern at a first position and the second at the second time includes the structured light pattern at a second position.

18. The system of claim 15, wherein the imaging sensor component comprises a single imaging sensor, wherein the reference image is captured at a first time with the single imaging sensor at a first position and the second image is captured at a second time with the single imaging sensor at a second position.

19. The system of claim 15, wherein combining the rectified second image with the reference image uses a linear weighted average of corresponding pixels.

20. The system of claim 15, wherein combining the rectified second image with the reference image further comprises applying a prior based on the structured light pattern to interpolated pixel values to determine final pixel values in the combined image.

* * * * *